United States Patent
Simofi-Ilyes et al.

(10) Patent No.: US 7,119,473 B2
(45) Date of Patent: Oct. 10, 2006

(54) BRUSH CARD ASSEMBLY WITH RFI SUPPRESSION FOR TWO OR THREE SPEED PERMANENT MAGNET BRUSH MOTOR WITH LINK WOUND DUAL COMMUTATOR AND DUAL ARMATURE WINDING CONFIGURATION

(75) Inventors: Attila Simofi-Ilyes, London (CA); Andrew Lakerdas, London (CA); Stefan Zenon Smorowski, London (CA); Steven Russell Van Horne, St. Thomas (CA); Michael John Koncan, London (CA)

(73) Assignee: Siemens VDO Automotive, Inc., Chatham (CA)

( * ) Notice: Subject to any disclaimer, the term of this patent is extended or adjusted under 35 U.S.C. 154(b) by 6 days.

(21) Appl. No.: 10/976,616

(22) Filed: Oct. 29, 2004

(65) Prior Publication Data

US 2005/0225195 A1     Oct. 13, 2005

Related U.S. Application Data

(60) Provisional application No. 60/560,457, filed on Apr. 8, 2004.

(51) Int. Cl.
*H02K 13/00*  (2006.01)

(52) U.S. Cl. ....................................................... 310/239

(58) Field of Classification Search ................ 310/127, 310/136–137, 148–149, 233–237, 239–248
See application file for complete search history.

(56) References Cited

U.S. PATENT DOCUMENTS

| | | | |
|---|---|---|---|
| 4,910,790 A | 3/1990 | Kershaw | 388/836 |
| 5,434,463 A * | 7/1995 | Horski | 310/248 |
| 5,689,148 A * | 11/1997 | Rubinchik | 310/239 |
| 5,925,999 A | 7/1999 | Lakerdas et al. | 318/496 |
| 6,694,599 B1 | 2/2004 | Kershaw et al. | 29/597 |

* cited by examiner

Primary Examiner—Thanh Lam

(57) ABSTRACT

A brush card assembly 30 is provided for a permanent magnet brush motor 50. The motor includes a link wound, high speed side commutator 46 and an associated high speed side armature winding 44, and a link wound low speed side commutator 54 and an associated low speed side armature winding 52. The brush card assembly includes a brush card 31 including a high speed side having a positive brush 32 and a negative brush 32' constructed and arranged to be operatively associated with the high speed side commutator 46, and a low speed side opposite the high speed side. The low speed side has a positive brush 33 and a negative brush 33' constructed and arranged to be operatively associated with the low speed side commutator 54. The brushes are constructed and arranged with respect to the commutators to provide at least two different operating speeds of the motor.

27 Claims, 6 Drawing Sheets

BRUSH CARD ASSEMBLY WITH RFI SUPPRESSION FOR TWO OR THREE SPEED PERMANENT MAGNET BRUSH MOTOR WITH LINK WOUND DUAL COMMUTATOR AND DUAL ARMATURE WINDING CONFIGURATION

This application is based on U.S. Provisional Application No. 60/560,457, filed on Apr. 8, 2004, and claims the benefit thereof for priority purposes.

FIELD OF THE INVENTION

The invention relates to permanent magnet direct current brush motors (PMDC BM) for automotive applications such as, engine cooling, Heating, Ventilation and Air Conditioning (HVAC), or Anti-lock Braking System (ABS).

BACKGROUND OF THE INVENTION

Often, permanent magnet motors used in automotive applications require the use of more than one speed, usually a lower speed for general-purpose operation and a maximum speed for worst-case operation. Multiple speed operation of the cooling system module provides a more optimized engine temperature and operation, which consequently contributes to improved fuel economy.

For PMDC BM historically lower speeds (multiple speed operation) have been achieved by the following methods:
Adding a resistor in series with the motor
Switching out brushes
Dual armature winding with dual commutator
Adding an additional $3^{rd}$ brush (short out coils)
External or internal electronic control comprised of but not limited to
SSR, (Solid State Relays)
Linear control
PWM, (Pulse Width Modulation)

The embodiment relates to a motor configuration with dual-armature windings and dual commutator configuration for a two-speed application. The DC motors having a dual-armature winding and two commutators are well known in the art. The following U.S. patents describe the art of dual-armature winding and dual commutators well: U.S. Pat. Nos. 5,925,999 and 4,910,790, and are hereby incorporated into the present specification by reference.

The current two speed motor configuration with dual-armature winding and two commutators is not cost competitive on the market compared to a two speed solution such as adding a resistor in series with the motor. However, the dual-armature winding with the two-commutator configuration is a more elegant and efficient method for two-speed application than the series resistor solution. Furthermore, from system and energy conservation point of view, the dual-armature winding (with two commutators) motor configuration is more effective than the motor with a series resistor; considering the fact that during the second speed (low speed) operation there is approximately a 20 to 25% current saving with a motor having the dual-armature winding (with two commutators) compared to a motor (of same type and size) with series resistor for low speed.

A conventional brush card assembly is shown in FIGS. 1 and 2. These two figures clearly illustrate the ingenuity and complexity of that configuration. FIG. 1 shows a Low Speed (LS) side of the brush card assembly, generally indicated at 10 and FIG. 2 shows a High Speed (HS) side of the same brush card assembly 10. There are total of eight brushes 12 and eight brush springs 14 and eight brush tubes 16 (4 sets for each side, LS and HS). Furthermore, there is a complex over molded terminal bar frame 18 which conveys power to the brushes 12 and interconnects the dual-armature windings (not shown).

Accordingly, there is a need to provide a brush card assembly for two-speed motor assembly that is more cost effective (lesser components) and of simpler configuration than conventional brush card assemblies, without compromising the functionality and integrity of the brush card assembly and motor assembly.

SUMMARY OF THE INVENTION

An object of the invention is to fulfill the need referred to above. In accordance with the principles of the present invention, this objective is achieved by providing a brush card assembly for a permanent magnet brush motor, the motor including a link wound, high speed side commutator and an associated high speed side armature winding, and a link wound low speed side commutator and an associated low speed side armature winding. The brush card assembly includes a brush card including a high speed side having a positive brush and a negative brush constructed and arranged to be operatively associated with the high speed side commutator. The brush card assembly also includes a low speed side opposite the high speed side. The low speed side has a positive brush and a negative brush constructed and arranged to be operatively associated with the low speed side commutator. The brushes are constructed and arranged such that when associated with the commutators, at least two different operating speeds of the motor are provided. A motor incorporating the brush card assembly is also provided.

In accordance with another aspect of the invention, a method of conveying power to a permanent magnet brush motor is provided. The motor includes a link wound, high speed side commutator and an associated high speed side armature winding; a link wound low speed side commutator and an associated low speed side armature winding; and a brush card assembly including a high speed side having a positive brush and a negative brush operatively associated with the high speed side commutator, and a low speed side opposite the high speed side, the low speed side having a positive brush and a negative brush operatively associated with the low speed side commutator. The method conveys power only to the positive brush on the high speed side so that the high speed side armature winding is energized through the high speed side link wound commutator to operate the motor at a first speed of operation, and conveys power to the positive brush on the low speed side to energize the low speed side armature winding, and conveys power through the negative brush on the low speed side to the positive brush on the high speed side to energize the high speed side armature winding to operate the motor at a speed less than the first speed of operation.

In accordance with yet another aspect of the invention, a brush holder structure is provided for a brush card assembly. The brush card assembly has a brush card of generally circular configuration having a central opening therethrough. The brush card assembly carries a plurality of brushes and a spring is associated with each brush to bias the associated brush towards the central opening. The brush holder structure includes a body having at least one peripheral surface. The body is constructed and arranged to be received in the central opening so that the at least one peripheral surface engages the brushes to cause the brushes to compress the springs thereby securing the brushes and springs during transport of the brush card assembly.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 3:
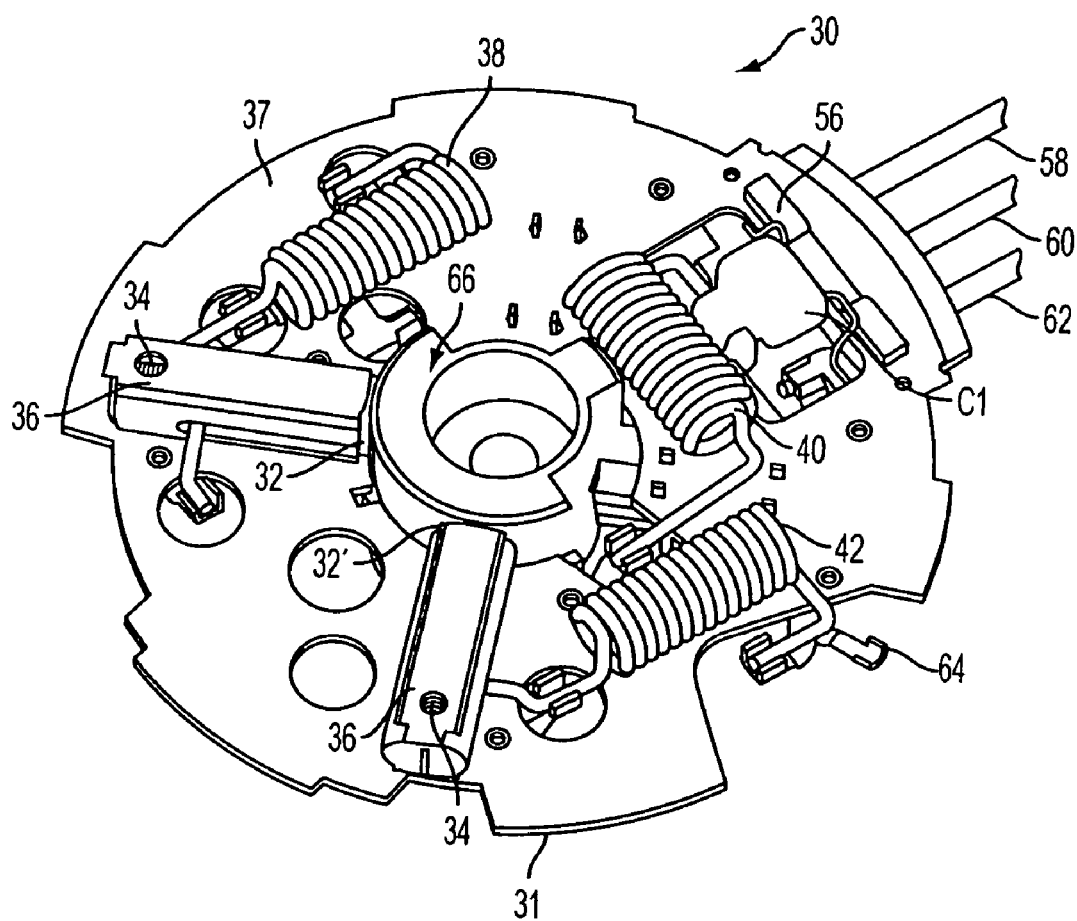
FIG. 3 shows a high speed side of a brush card assembly provided in accordance with the invention.
Figure 4:
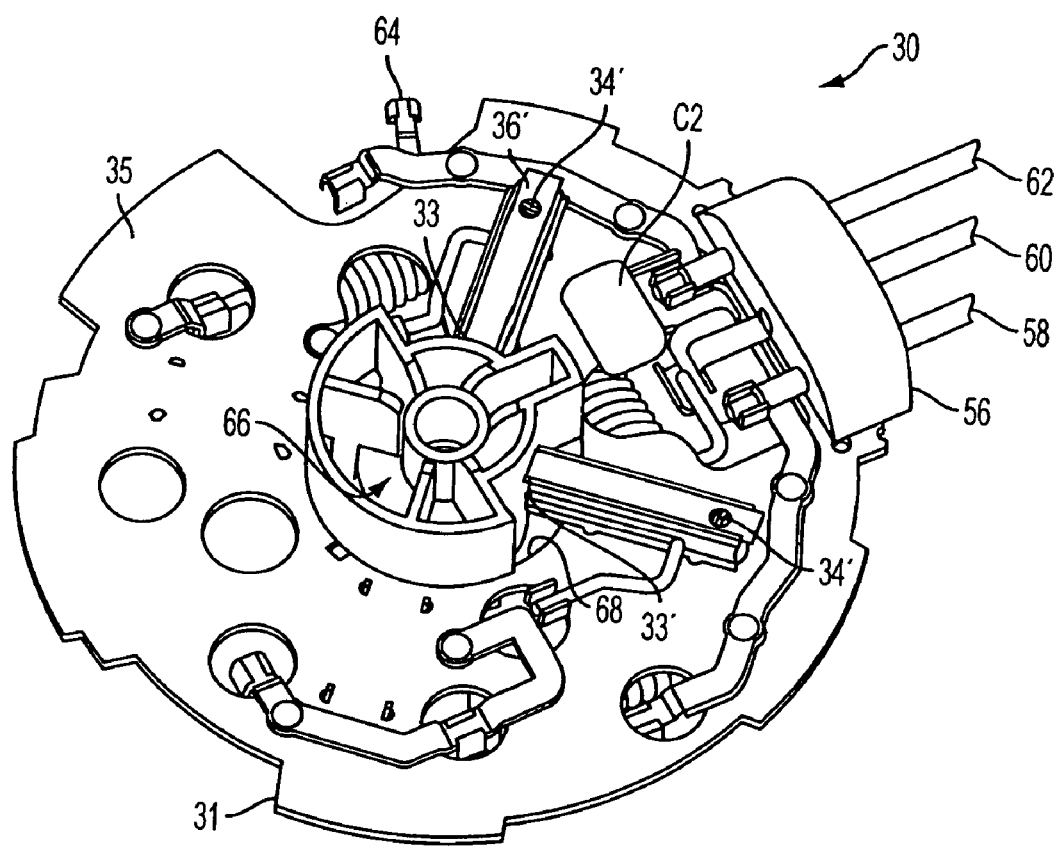
FIG. 4 shows a low speed side of a brush card assembly of FIG. 3.

With reference to FIGS. 3 and 4, a brush card assembly, generally indicated at 30, is shown in accordance with the principles of the invention. The brush card assembly 30 is a subcomponent (assembly) of a motor configuration with link wound dual commutators and dual-armature winding configuration. The link wound technology is also well known in the art and is disclosed, for example, in U.S. Pat. No. 6,694,599, the contents of which is hereby incorporated into the present specification by reference.

FIG. 3 shows the high speed (HS) side 37 and FIG. 4 shows the low speed (LS) side 35 of the same brush card 31 of the brush card assembly 30. As shown in FIG. 3, there is a pair of brushes (positive brush 32 and negative brush 32'), brush springs 34, and brush tubes 36 at the HS side 37 of the brush card assembly 30. Also, there is a pair of brushes (positive brush 33 and negative brush 33'), brush springs 34', and brush tubes 36' at the LS side 35 of the brush card assembly 30 (FIG. 4). Thus, the brush card assembly 30 and terminal bus bar system is a much simpler configuration than the conventional assembly of FIGS. 1 and 2.

As shown in FIG. 3, chokes, for Radio Frequency Interference (RFI) suppression, are provided on the HS side of the assembly 30. Choke 38 is provided for both the positive brush 32 for HS and the negative brush 33'. Choke 40 is provided for the positive brush 33 for LS and choke 42 is provided for the negative brush 32' for HS. The brushes and tubes extend radially with respect to the generally circular brush card 31. A capacitor C1 is provided on the HS side 37 of the brush card 31 and a capacitor C2 is provided on the LS side 35 of the brush card 31 for RFI suppression.

Figure 5:
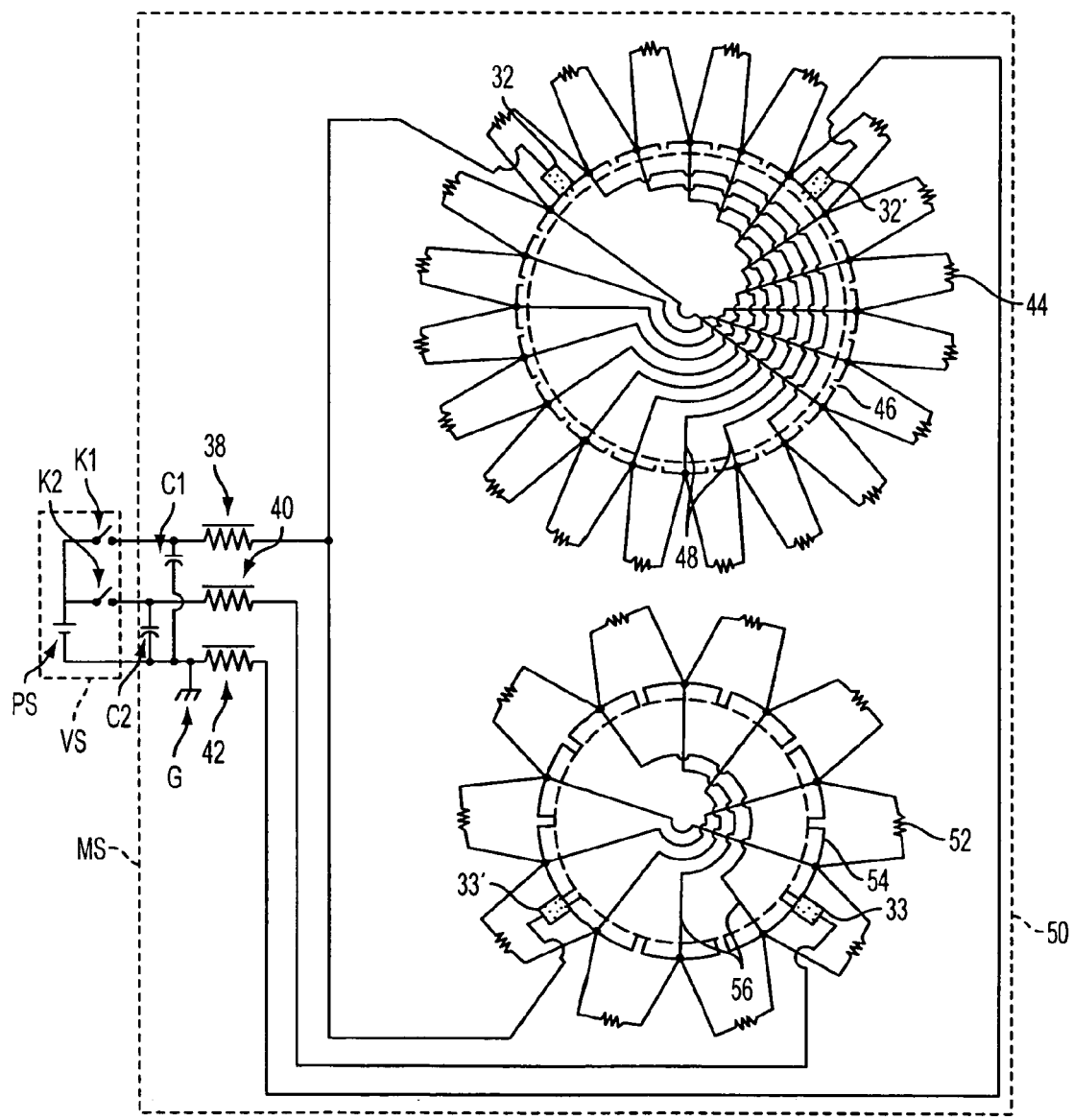
FIG. 5 is a schematic showing interconnections for low and high speed circuits for the brush card assembly of the invention associated with two commutators of different sizes.

FIG. 5 illustrates the interconnections for both LS and HS circuits and the overall system layout. Thus, FIG. 5 illustrates how the brush card assembly 30 conveys power for both speeds (LS and HS) operation and also illustrates the total electrical circuit layout including the vehicle side (VS) and motor side (MS) connections.

The Power Source (PS) or battery provides power to the system and, depending on what operation is required (LS or HS), switch K1 or K2 is turned ON. Switch K1 is turned ON and switch K2 is OFF when high-speed operation is required. Then power is conveyed only to brush 32 and the HS side armature winding 44 is energized through the linked wound, HS side commutator 46. The link wound interconnections (two identified at 48) are the same as, or similar to, those shown in U.S. Pat. No. 6,694,599. The motor 50 of the embodiment, being a four pole motor, operates with two brushes because the commutator 46 is linked wound and the four current paths are properly maintained; furthermore the brushes are properly positioned referenced to the magnet centerline and are positioned approximately 90 degrees apart from each other.

When low speed is required, the switch K2 is turned ON and the switch K1 is OFF. Then the power is conveyed first to the brush 33 and the current flows through the LS side armature winding 52, (the four current paths are maintained through the link wound, LS side commutator 54). The link wound interconnections (two identified at 56) are the same as, or similar to, those shown in U.S. Pat. No. 6,694,599. Furthermore, through the brush 33', the power is conveyed to the brush 32 and the armature winding 44 at HS side 37 is also energized. Therefore, at LS operation the two armature windings 44 and 52 are connected in series. The brushes 33, 33' at the LS side are positioned at approximately 180 deg. from the HS side brushes 32, 32'. Furthermore, the LS side brushes 33, 33' are also approximately 90 deg. apart from each other.

As noted above, a choke is provided on the brush card assembly between each brush and PS for RFI (Radio Frequency Interference) suppression. Also capacitors C1 and C2 are provided for the same reason; one typical arrangements and placement of RFI components is shown in FIG. 5. However, the actual capacitor value and placement configuration has to be determined based on the suppression level required by the specific application.

Although FIG. 5 illustrates a circuit connection for two-speed motor operation, it is possible to accomplish an additional (third) speed operation by adding two additional switches, (K3 and K4 are not shown). The K3 switch is placed in the circuit to provide electrical connection to brush 33' for second speed (LS) operation. Also, the K3 function is to break the electrical connection between brush 33' and brush 32 during the third speed operation. The K4 is placed in the electrical circuit to connect the brush 33' to brush 32' for third speed operation, (brush 32' has the same potential as the negative side of PS or battery minus). Also the K4 switch function is to break the electrical connection between brushes 33' and 32' when the third speed is not required. The switches K1, K2, K3 and K4 can be, for example, electromagnetic relays or MOSFETs.

Figure 6:
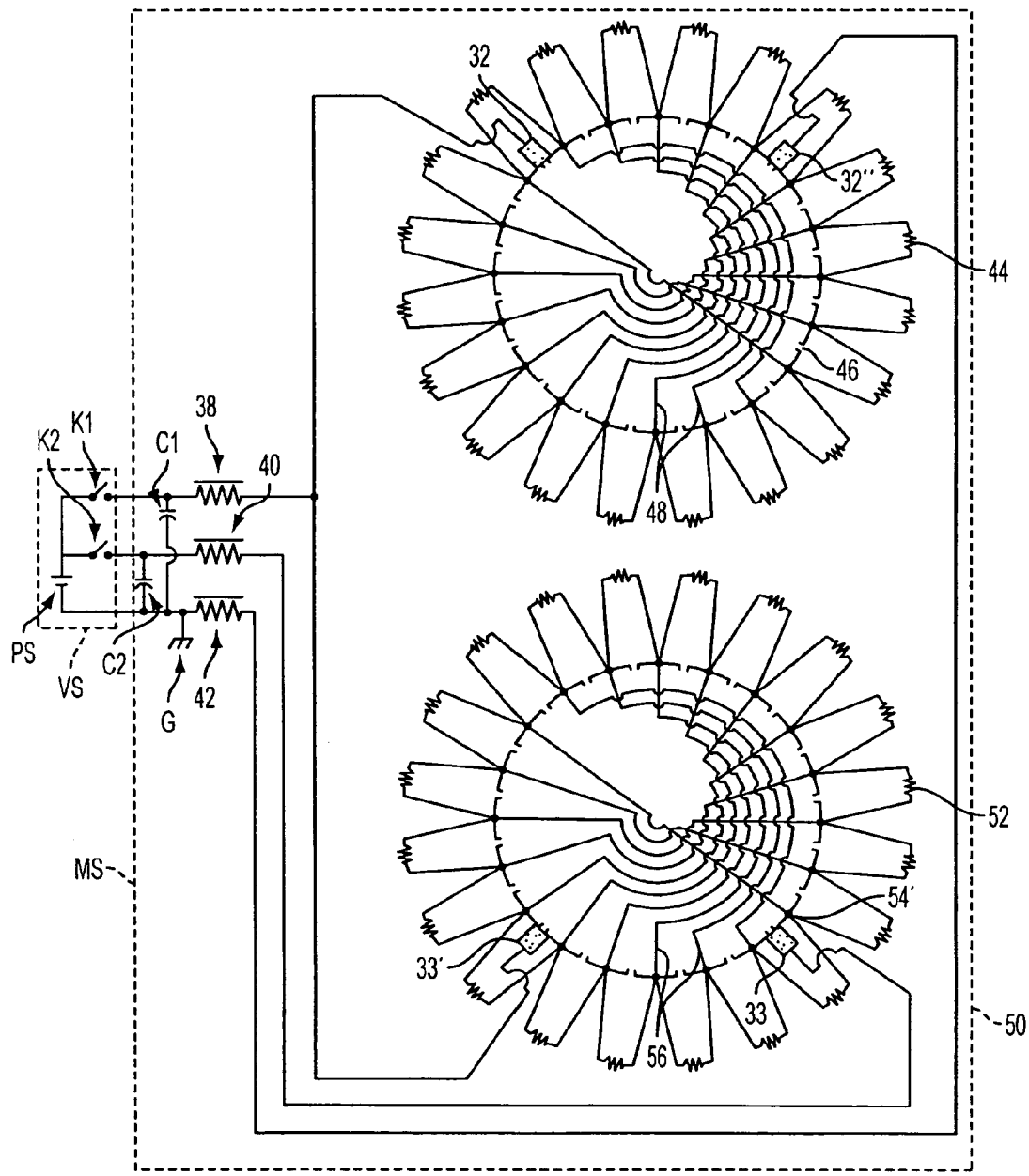
FIG. 6 is a schematic showing interconnections for low and high speed circuits for the brush card assembly of the invention associated with two commutators of the same size.
Figure 7:
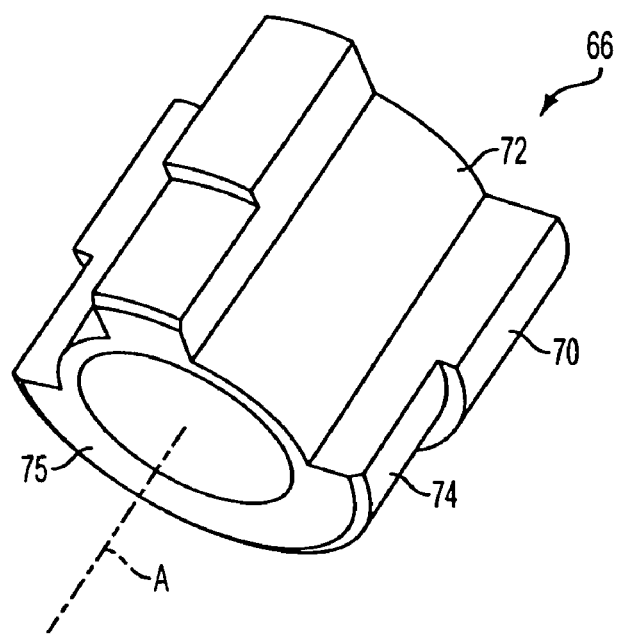
FIG. 7 is a perspective view of a brush holder structure provided in accordance with the present invention.
Figure 8:
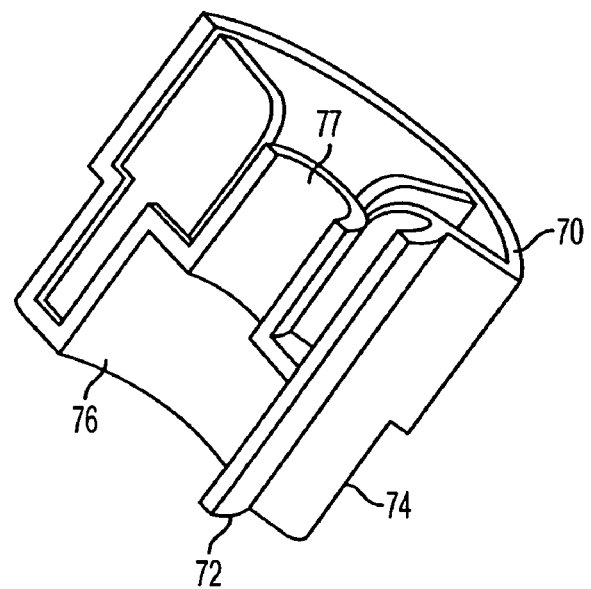
FIG. 8 is a sectional view of the brush holder structure of FIG. 7.

As shown in the embodiment of FIG. 5, the LS side commutator 54 is smaller than the HS side commutator 46 and has fewer commutator bars than commutator 46. Hence, the LS side brushes 33, 33' are smaller and closer to the center of the brush card assembly 30 (see FIGS. 3 and 4). However, there is no significant change in the configuration of the brush card assembly 30 for a dual commutator configuration with same diametric dimensions for both commutators (FIG. 6). Thus, FIG. 6 shows another embodiment where the link wound commutators 46 and 54' are of the same size and have the same number of commutator bars. The electrical connection and components layout of the embodiment of FIG. 6 is essentially the same as shown in FIGS. 3 and 4, except all four brushes and brush tubes can be the same or similar size and can be placed at the same radial distance from the center of the generally circular brush card assembly 30.

Figure 1:
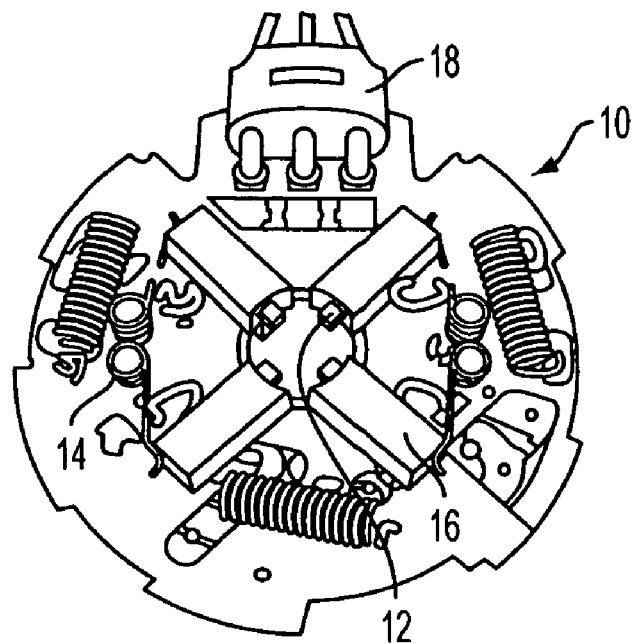
FIG. 1 shows a low speed side of a conventional brush card assembly.
Figure 2:
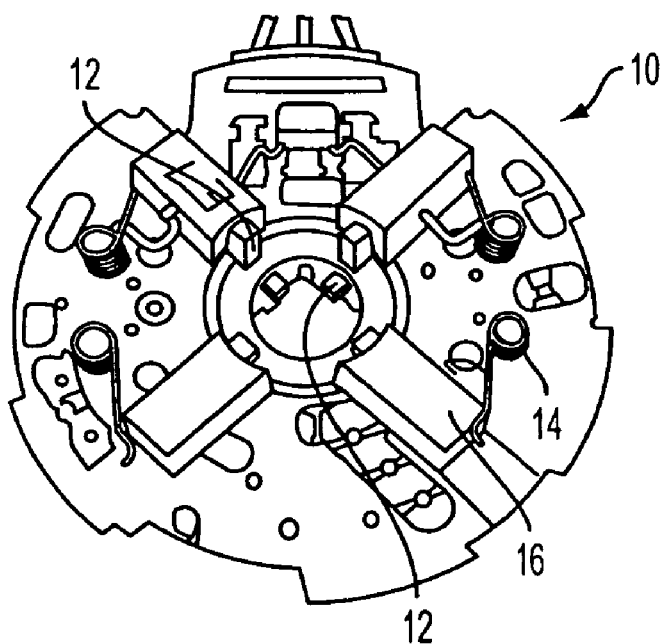
FIG. 2 shows a high speed side of the conventional brush card assembly of FIG. 1.

As shown in FIGS. 3 and 4, instead of providing a complex over-molded terminal bar frame as in FIG. 1, the embodiment includes a simple grommet 56 constructed and arranged to secure the lead wires to the brush card 31. The lead wires include the negative lead wire 58, the LS lead wire 60 and the HS lead wire 62. FIGS. 3 and 4 also show a bus bar contact 64 to the motor case or ground G. The bus bar conveying power to the brushes can be made by any manufacturing method.

With reference to FIGS. 3, 4, 7 and 8, a brush holder structure, generally indicated at 66, is constructed and arranged be disposed in central opening 68 of the brush card 31 to hold all four brushes (32, 32', 33 and 33') of the brush card assembly 30 so that the brush springs 34 are in a compressed condition. Thus, the brush holder structure has a body 70 having peripheral surfaces 72, 74 that engage the brushes to cause the springs 34 and 34' to compress in the brush tubes 36. In the embodiment, since brushes 33 and 33' are closer to the center of the brush card 31 than brushes 32, 32', surface 72 is closer to center line A of the body 70 than surface 74. When brushes are provided at the same distance from the center of the brush card 31, the surfaces 72 and 74 are at the same distance for the centerline A and can be considered to be the same surface. The brush holder structure 66 also includes a cavity 76 for receiving at leas a portion of a commutator and a cavity 77 for receiving at least a portion of a motor shaft.

During assembly, when the brush card assembly with the brush holder structure 66 holding the brushes is placed on top of an armature and stator assembly, the cavity 76 and the cavity 77 act as a guide for proper brush to commutator engagement. As the bottom face 75 of the brush holder structure 66 contacts the face of the commutator (not shown) the brushes can slide onto the commutator(s) surface freely by pushing down on the brush card. Then, the brush holder structure 66 can be removed. The brushes can slide freely onto the commutator surface from the brush holder structure 66, because the diameter referenced to center A (which is the center of motor shaft and commutator(s) of portion defined by surface 74 is slightly larger than the corresponding commutator surface.

Thus, the brush holder structure 66, allows packaging the brush card assembly 30 at brush card supplier without brush springs/brushes falling out of the assembly 30. Then, brush card assemblies 30 can be shipped to motor manufacturers and the brush holding structure 66 can be removed at final motor assembly and the structure 66 can be shipped back to brush card supplier and reused on a new brush card assemblies.

It can be appreciated that the brush card assembly 30 is more cost effective (due to lesser components) and of simpler configuration than the conventional brush card assembly (FIGS. 1 and 2) and does not compromise the functionality and integrity of the brush card assembly and motor assembly to which it is assembled.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A brush card assembly for a permanent magnet brush motor, the motor including a link wound, high speed side commutator and an associated high speed side armature winding, and a link wound low speed side commutator and an associated low speed side armature winding, the brush card assembly comprising:
   a brush card including:
      a high speed side having only one pair of brushes including a positive brush and a negative brush constructed and arranged to be operatively associated with the high speed side commutator, and
      a low speed side opposite the high speed side, the low speed side having only one pair of brushes including a positive brush and a negative brush constructed and arranged to be operatively associated with the low speed side commutator,
   wherein the brushes are constructed and arranged such that when associated with the commutators, at least two different operating speeds of the motor are provided.

2. The brush card assembly of claim 1, wherein the brush card is generally of circular configuration, with each brush extending radially.

3. The brush card assembly of claim 2, wherein each of the brushes on the low speed side is of a size smaller than each of the brushes on the high-speed side.

4. The brush card assembly of claim 2, wherein the brushes on the low speed side are disposed generally 90 degrees apart from each other, and the brushes on the high speed side are disposed generally 90 degrees apart from each other.

5. The brush card assembly of claim 4, wherein the brushes on the low speed side are disposed generally 180 degrees from the brushes on the high-speed side.

6. The brush card assembly of claim 3, wherein each brush on the low speed side is disposed radially closer to a center of the brush card than each brush on the high speed side.

7. The brush card assembly of claim 2, wherein the brushes on the low speed side are of generally the same size as the brushes on the high speed side and are disposed generally a same radial distance from a center of the brush card.

8. The brush card assembly of claim 1, in combination with switches constructed and arranged to. selectively convey power to the brushes to provide the at least two different operation speeds of the motor.

9. The brush card assembly of claim 1, wherein the brushes are constructed and arranged to interconnect the two windings in series.

10. The brush card assembly of claim 1, wherein the brushes are constructed and arranged to interconnect the two windings in parallel.

11. The brush card assembly of claim 1, further comprising choke structure electrically connected between each brush and a power source of the assembly.

12. The brush card assembly of claim 1, wherein the brush card includes a grommet constructed and arranged to secure power lead wires to the brush card.

13. The brush card assembly of claim 1, wherein each brush is disposed in a brush tube and a spring in each brush tube biases an associated brush.

14. A permanent magnet brush motor, the motor comprising:
   a link wound, high speed side commutator,
   a high speed side armature winding associated with the high-speed side commutator,
   a link wound low speed side commutator,
   a low speed side armature winding associated with the low speed side commutator, and
   a brush card including:
      a high speed side having only one pair of brushes including a positive brush and a negative brush operatively associated with the high speed side commutator, and
      a low speed side opposite the high speed side, the low speed side having only one pair of brushes including a positive brush and a negative brush operatively associated with the low speed side commutator,
   wherein the brushes are constructed and arranged with respect to the commutators to provide at least two different operating speeds of the motor.

15. The motor of claim 14, wherein the brush card is generally of circular configuration, with each brush extending radially.

16. The motor of claim 15, wherein the low speed commutator is of a size smaller than the high speed side commutator, and each of the brushes on the low speed side is of a size smaller than a size of each of the brushes on the high-speed side, and each of the brushes on the low speed side is closer to a center of the brush card than each of the brushes on the high speed side.

17. The motor of claim 15, wherein the brushes on the low speed side are disposed generally 90 degrees apart from each other, and the brushes on the high speed side are disposed generally 90 degrees apart from each other.

18. The motor of claim 17, wherein the brushes at the low speed side are disposed generally 180 degrees from the brushes on the high-speed side.

19. The motor of claim 15, wherein the brushes on the low speed side are of generally the same size as the brushes on the high-speed side and are disposed generally a same radial distance from a center of the brush card.

20. The motor of claim 14, in combination with switches constructed and arranged to selectively convey power to the brushes to provide the at least two different operation speeds of the motor.

21. The motor of claim 14, wherein the brushes interconnect the two windings in series.

22. The motor of claim 14, wherein the brushes interconnect the two windings in parallel.

23. The motor of claim 14, further comprising choke structure electrically connected between each brush and a power source of the motor.

24. The motor of claim 14, wherein the brush card includes a grommet constructed and arranged to secure power lead wires to the brush card.

25. The motor of claim 14, wherein each brush is disposed in a brush tube and a spring in each brush tube biases an associated brush.

26. A brush holder structure for a brush card assembly, the brush card assembly having a brush card of generally circular configuration having a central opening therethrough, the brush card assembly carrying a plurality of brushes and a spring associated with each brush to bias the associated brush towards the central opening, the brush holder structure comprising:
   a body having at least one peripheral surface, the body being constructed and arranged to be received in the central opening so that the at least one peripheral surface engages the brushes to cause the brushes to compress the springs thereby securing the brushes and springs during transport of the brush card assembly and prior to assembling the brush card with a commutator.

27. The brush holder structure of claim 26, wherein the body has a first cavity for receiving at least a portion of a commutator and a second cavity for receiving at least a portion of a shaft of a motor.

* * * * *